United States Patent [19]

Janssen et al.

[11] Patent Number: 4,978,374

[45] Date of Patent: Dec. 18, 1990

[54] LIQUID HYDROCARBON DELIVERY MEANS INCLUDING MEANS FOR MONITORING GAS CONTENT

[75] Inventors: Sylvain Janssen, Neuilly; Jacques Fournier, Bretigny S/Orge, both of France

[73] Assignee: Schlumberger Industries, Montrouge, France

[21] Appl. No.: 396,719

[22] Filed: Aug. 22, 1989

[30] Foreign Application Priority Data

Sep. 2, 1988 [FR] France ................................ 88 11529

[51] Int. Cl.[5] .............................................. B01D 19/00

[52] U.S. Cl. .......................................... 55/165; 55/88; 55/199; 141/46; 141/59

[58] Field of Search .................... 55/88, 165, 183, 184, 55/213, 199, 201; 141/46, 50, 59

[56] References Cited

U.S. PATENT DOCUMENTS 2,952,329 9/1960 Cunningham et al. ............... 55/199
3,867,955 2/1975 Scott .................................. 137/179
3,905,405 9/1975 Fowler et al. ........................ 141/46
4,799,940 1/1989 Millikan ............................. 55/88 X

FOREIGN PATENT DOCUMENTS 844209 7/1939 France .

*Primary Examiner*—Charles Hart
*Attorney, Agent, or Firm*—Sanford J. Asman

[57] ABSTRACT

When a hydrocarbon liquid is pumped (11) for retail delivery, it is degassed by means of a vortex device (13). A control valve (21) shuts off delivery if the gas content in the degassed liquid being delivered via a main duct (16) is too high. Unlike prior systems which sense gas content only in the liquid being delivered, the present invention senses the greater gas content in the recycled gas-enriched fraction from the vortex separator device (13). This is done by means of a venturi system (19) controlling a servo-valve (25) which in turn controls the control valve (21). By using a magnified image of the gas content, the system is made more sensitive and more reliable.

4 Claims, 1 Drawing Sheet

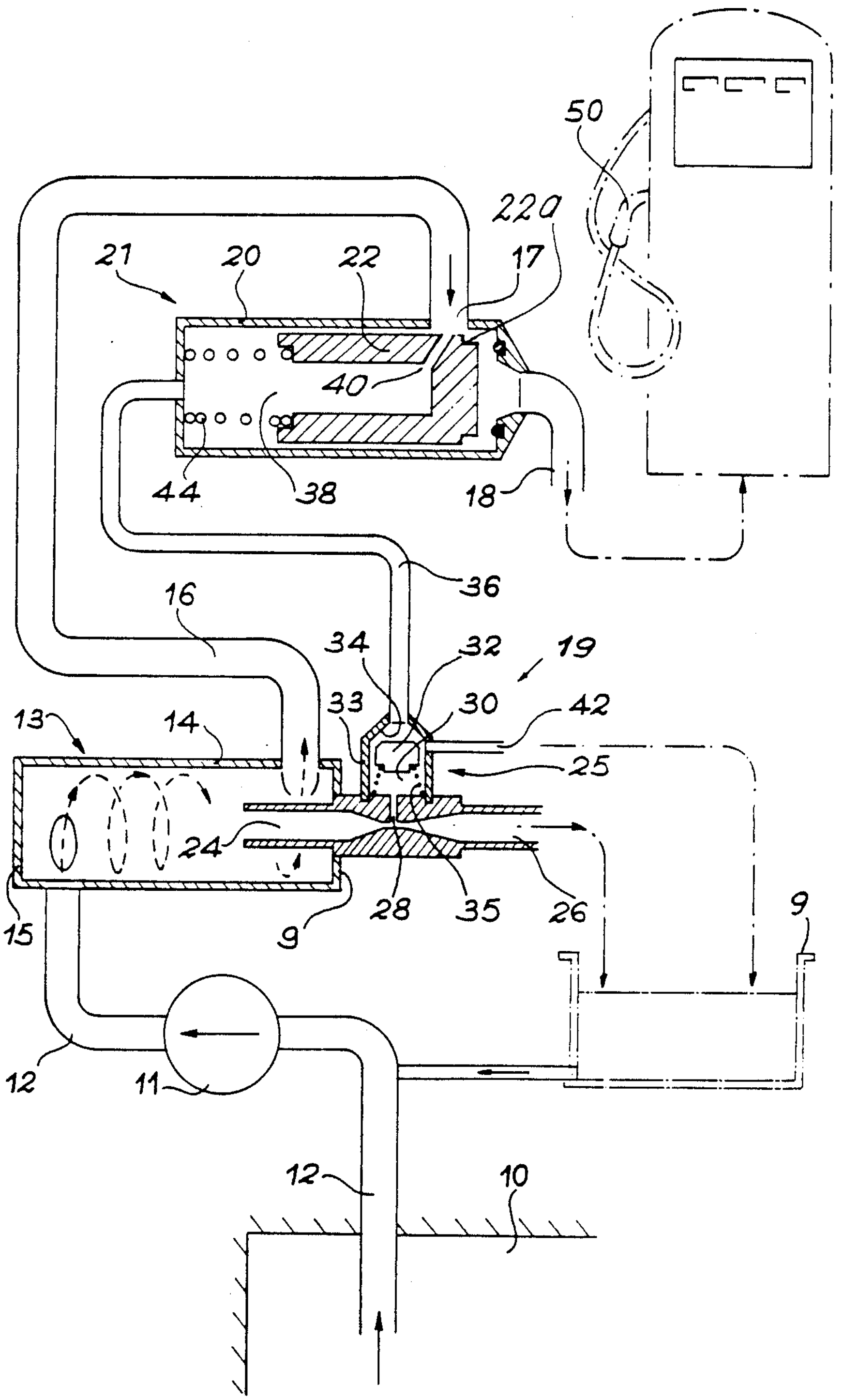
50
220
21
20
22
17
40
44
38
18
36
16
34
32
19
13
14
33
30
42
25
24
28
35
26
9
15
9
12
11
12
10

LIQUID HYDROCARBON DELIVERY MEANS INCLUDING MEANS FOR MONITORING GAS CONTENT

The invention relates to retail delivery of liquid hydrocarbons such as petrol and diesel fuel. More particularly, the present invention relates to controlling hydrocarbon delivery as a function of the gas content of the hydrocarbon.

BACKGROUND OF THE INVENTION

In installations for delivering liquid hydrocarbons, hydrocarbon delivery needs to be controlled in such a manner as to ensure that delivery is stopped when the hydrocarbon has too high a gas content. This applies particularly when air from various leaks in the circuits gets into the hydrocarbon. In prior art control systems, a valve device is used upstream from the hydrocarbon delivery tube for stopping the flow of hydrocarbon to the delivery end of the tube under certain circumstances. The valve is rated so that it closes when the delivery pressure drops because excess gas is present in the hydrocarbon.

This type of device comprises the following items downstream from the hydrocarbon storage tank. A pump extracts the hydrocarbon from the storage tank and sends it to a degassing device. The degassing device is generally of the vortex type. Degassed hydrocarbon is taken from the periphery of the degassing device tangentially thereto and is sent towards the valve device. An auxiliary outlet located in the middle of the degassing device recovers hydrocarbon containing gas and returns it to the storage tank.

It turns out that this type of device using a control valve is not always effective in the presence of excess gas. The excess may be due to the fact that when the gas content at the inlet to the degassing device is too high, then the degassing device saturates. In addition, operation of the control valve may be random.

The object of the present invention is to remedy these drawbacks and to provide a system for controlling the valve device which enables the operating reliability of the valve device to be very considerably increased and which also enables the gas content level at which the control valve closes to be adjusted accurately.

SUMMARY OF THE INVENTION

The present invention provides hydrocarbon delivery means comprising:

a pump for extracting hydrocarbon from a storage tank;

a vortex type degassing device comprising an inlet duct connected to said pump, an outlet duct, and an axial auxiliary outlet for taking off a fraction of the hydrocarbon which is enriched in gas;

a hydrocarbon delivery tube;

a control valve mounted between said delivery tube and the outlet from said degassing device; and a servo-control device for servo-controlling said control valve as a function of the gas content in the hydrocarbon, said servo-control device comprising a venturi system mounted on said auxiliary outlet and means for causing said control valve to close as a function of the pressure in said venturi system.

In a preferred embodiment, the servo-control means for servo-controlling said control valve comprise a servo-control valve which is closed when the pressure at the throat of the venturi system is higher than a predetermined value, and control means for causing the control valve to close when said servo-control valve is closed.

BRIEF DESCRIPTION OF THE DRAWING

An embodiment of the invention is described by way of example with reference to the sole FIGURE of the accompanying drawing which is a diagram shown partially in cross-section.

DETAILED DESCRIPTION

Hydrocarbon delivery means in accordance with the invention mainly comprise a pump 11, a degassing device 13, a control valve 21 for controlling a delivery tube 50, and servo-control means 19 for controlling the valve 21 as a function of the gas content of the hydrocarbon delivered by the degassing device 13.

The hydrocarbon is stored in a storage tank 10, and the pump 11 takes hydrocarbon from the tank via a dip tube 12 and delivers it to the degassing device 13. The degassing device is mainly constituted by a cylindrical body 14 having the dip tube 12 delivering hydrocarbon tangentially to a first end 15 thereof. When the pump 11 is in operation, the hydrocarbon it delivers arrives tangentially inside the cylindrical body 14 setting up a vortex type of spinning motion. At a second end 9 of the cylindrical body 14 there is a main duct 16 connected identically to the dip tube 12, i.e. tangentially to the cylindrical body 14. Thus, by virtue of the vortex motion, and given that hydrocarbon with a low gas content is lighter than hydrocarbon with a high gas content, low gas hydrocarbon moves along the inside periphery of the cylindrical body 14, while hydrocarbon having a higher gas content moves along the center of the cylindrical body 14. The main duct 16 therefore takes substantially degassed hydrocarbon from the periphery of the main body. An auxiliary outlet 24 from the degassing device 13 is also placed at the second end 9 thereof and is disposed centrally relative to the cylindrical body 14. As a result, hydrocarbon with too high a gas content leaves via the auxiliary outlet 24 and is delivered to a settling tank 90 for recycling the hydrocarbon.

In order to improve the operation of the control valve 21, servo-control means 19 are installed between the degassing device 13 and the control valve 21 in order to take the pressure of the hydrocarbon and thus its gas content into account more accurately. The servo-control means are described in greater detail below.

The main duct 16 leads to the control valve 21 which is mainly constituted by a control body 20 having a control valve member 22 slidably mounted therein. The valve member can thus take up at least two longitudinal positions: a first position which shuts off the connection between the inlet 17 from the main duct 16 and the hose 18 to the delivery tube 50; and a second position in which communication is left open between the inlet 17 from the main duct 16 and the hose 18 to the delivery tube 50. A first spring 44 bears against the bottom of the control body 20 and urges the control valve member 22 towards the first position.

In accordance with the invention, the means for servo-controlling the control device are mainly constituted by a venturi 25 and control means for causing the control valve member 22 to close as a function of the pressure in the throat of the venturi 25. These control means comprise a servo-control duct 36 and a servo-control valve constituted by a servo-control body 33 having a servo-control valve member 32 movably mounted therein. The venturi 25 is placed on the auxiliary outlet 24 of the degassing device 13, with the final outlet 26 feeding the recycling tank 90. A duct 28 is provided in the venturi 25, extending perpendicularly thereto and opening out into the throat of the venturi 25. The servo-control body 33 faces the outlet of this duct 28 in the venturi 25 with an internal chamber 30 of the servo-control body 33 being in communication with the throat of the venturi 25. An orifice 42 connects the internal chamber 30 to the outside. The servo-control duct 36 connects the control volume 38 of the control valve 21 to the servo-control body 33. The servo-control valve member 32 slides inside the servo-oontrol body 33 between a first position in which it closes the servo-control duct 36 where it opens out into the chamber 30 in the servo-control body 33 and a second position in which it leaves the servo-control duct 36 in communication with the chamber 30. The sliding connection between the servo-control valve member 32 and the inside of the servo-control body 33 is sealed. A second spring 35 is placed behind the valve member 32 and urges it towards the first position where it completely shuts off the servo-control duct 36 by bearing against a seat 34 in the body 33.

A duct 40 is provided through the control valve member 22 in order to provide permanent communication between the control volume 38 of the control valve 21 and the main duct 16 in both positions of the control valve member 22. This enables the liquid to pass from the main duct 16 into the control volume 38 in addition to the fluid passing via the small leak that exists between the periphery of the control valve member 22 and the inside wall of the control body 20. This feature serves to avoid phenomena of the control valve member 22 oscillating and facilitates damping the motion thereof.

A meter device may be interposed between the outlet hose 18 and the delivery tube 50.

The control means operates as follows. So long as the gas content of the hydrocarbon remains low, the density of the fluid extracted via the auxiliary outlet 24 and the venturi 25 remains high. A considerable pressure drop thus occurs in the throat of the venturi 25 and in the duct 28 leading to the servo-control body 33. This pressure drop holds the servo-control valve member 32 in the open position, i.e. in a position which leaves the servo-control duct 36 in communication with the orifice 42 of the servo-control body 33.

The fluid penetrating into the control valve 21 from the main duct 16 also penetrates to some extent into the control volume 38. It can therefore also flow along the servo-control duct 36 towards the chamber 30 in the servo-control body 33 which it then leaves via the orifice 42 which is in communication with the outside. The pressure in the control volume 38 of the control valve 21 is therefore low and practically equal to atmospheric pressure. Consequently, the control valve member 22 remains in its open position allowing hydrocarbon to be delivered towards the delivery tube 50.

In contrast, if the gas content in the hydrocarbon is high, then there is a large difference between the density of the fluid moving along the periphery of the cylindrical body 14 of the degassing device 13 and the fluid moving along the middle of the cylindrical body 14, with the middle fluid being of lower density. The fluid flowing through the venturi 25 is thus of lower density and so the pressure drop generated by the venturi 25 is smaller. The pressure in the duct 28 of the venturi 25 therefore increases. The spring 35 engaging the servo-control valve member 32 is designed to respond above a determined value of pressure drop corresponding to a given gas content in the hydrocarbon, at which point the servo-control valve member 32 is pressed against the seat 34 of the servo-control body 33. The flow of fluid along the servo-control duct 36 towards the orifice 42 communicating with the outside is thus shut off. With the servo-control member 32 in the closed position, the pressure in the control volume 38 changes progressively to become equal to the pressure in the main duct 16 by virtue of the leaks past the control valve member 22 and by virtue of the duct 40 through the control valve member 22. The pressure on both sides of the control valve member 22 then becomes substantially equal, thereby causing it to close under thrust from the spring 44. The delivery tube 50 is no longer supplied with hydrocarbon.

The control valve member 22 can open again only if the servo-control valve member 32 opens. i.e. only if the gas content falls below the predetermined gas content. When the servo-control valve member 32 opens, then the control volume 38 is put into communication with the orifice 42 and its pressure changes progressively to become equal to atmospheric pressure. Meanwhile, the pressure in the main duct 16 which is much higher than atmospheric pressure acts on the periphery *22a* of the active face of the control valve member 22 and this suffices to compress the first spring 44, thereby opening the control valve member 22.

In prior art devices, the gas content is measured in the main duct 16. The presence of excess gas lowers the pressure of the hydrocarbon and gas mixture, thereby causing the control valve 21 to close. According to the invention, gas content is determined at the auxiliary outlet 24 from the degassing device 13. Although the gas content of the fluid flowing through the auxiliary outlet 24 is representative of the gas content in the main duct 16, it is greatly amplified relative thereto. This is because the auxiliary outlet 24 is the axial outlet which takes fluid from that zone of the vortex degassing device in which the fluid is most enriched in gas.

The springs 44 and 35 can be designed in advance so that the control valve 21 and the servo-control means react to predetermined pressure values corresponding to a predetermined gas content in the hydrocarbon, and the device of the invention can be applied to various different hydrocarbon delivery installations and under different conditions of use.

We claim:

1. Hydrocarbon delivery means comprising:
   - a pump for extracting hydrocarbon from a storage tank;
   - a vortex type degassing device comprising an inlet duct connected to said pump, an outlet duct, and an axial auxiliary outlet for taking off a fraction of the hydrocarbon which is enriched in gas;
   - a hydrocarbon delivery tube;
   - a control valve mounted between said delivery tube and the outlet from said degassing device; and
   - a servo-control device for servo-controlling said control valve as a function of the gas content in the hydrocarbon, said servo-control device comprising a venturi system mounted on said auxiliary outlet and means for causing said control valve to close as a function of the pressure in said venturi system.

2. Hydrocarbon delivery means according to claim 1, in which the servo-control means for servo-controlling said control valve comprise a servo-control valve which is closed when the pressure at the throat of the venturi system is higher than a predetermined value, and control means for causing the control valve to close when said servo-control valve is closed.

3. Hydrocarbon delivery means according to claim 2, in which said control valve includes a seat and a moving valve member for cutting off the flow of hydrocarbon from the degassing device to said delivery tube when a first face of the valve member is pressed against said seat, and in which said control means for controlling said control valve further include a control chamber delimited by a second face of said valve member.

4. Hydrocarbon delivery means according to claim 3, in which said servo-control valve is connected to said control chamber in order to put the control chamber into communication with an exhaust duct when the servo-control valve is open and in order to shut off said communication when said servo-control valve is closed.

* * * * *